United States Patent [19]
Becker

[11] 3,863,300
[45] Feb. 4, 1975

[54] MOLDING RETAINER AND METHOD OF COUPLING THE COMPONENT PARTS THEREOF

[75] Inventor: Charles Henry Becker, Braintree, Mass.

[73] Assignee: TRW Inc., Cleveland, Ohio

[22] Filed: Aug. 18, 1972

[21] Appl. No.: 281,697

[52] U.S. Cl. ............... 24/73 BC, 85/9, 151/41.72
[51] Int. Cl. ............................................ A44b 21/00
[58] Field of Search ......... 24/73 BC, 73 PM, 73 SB, 24/73 CM, 73 HS, 73 RM; 52/718; 85/9; 151/41.72

[56] References Cited
UNITED STATES PATENTS

| | | | |
|---|---|---|---|
| 2,531,351 | 11/1950 | Churchill | 24/73 BC |
| 2,713,186 | 7/1955 | Borowsky | 24/73 BC |
| 3,011,234 | 12/1961 | Fiddler | 24/73 |
| 3,120,686 | 2/1964 | Pickering | 24/73 BC |
| 3,362,449 | 1/1968 | Barwick et al. | 85/9 R |
| 3,520,031 | 7/1970 | Nelson | 52/718 |

Primary Examiner—Paul R. Gilliam
Assistant Examiner—Kenneth J. Dorner
Attorney, Agent, or Firm—James R. O'Connor

[57] ABSTRACT

A molding retainer having an apertured molding engaging cross plate and an attaching bolt secured to the cross plate includes a wire spring arm for biasing the cross plate into a molding engaging attitude. The wire spring arm is clamped against the underside of the cross plate by a flange on the bolt shank disposed beneath the cross plate and spaced from the head of the bolt. The bolt is nonrotatably locked to the cross plate through the aggressive engagement of the walls of the polygonal aperture in the cross plate by a bolt shank section of corresponding polygonal configuration which shank section is formed by the deformation and axial flow of the bolt material incident to the forming of the bolt head, which forming is carried out subsequent to the seating of the bolt in the cross plate aperture. An improved method of joining the cross plate and bolt components of a molding retainer is also disclosed.

9 Claims, 5 Drawing Figures

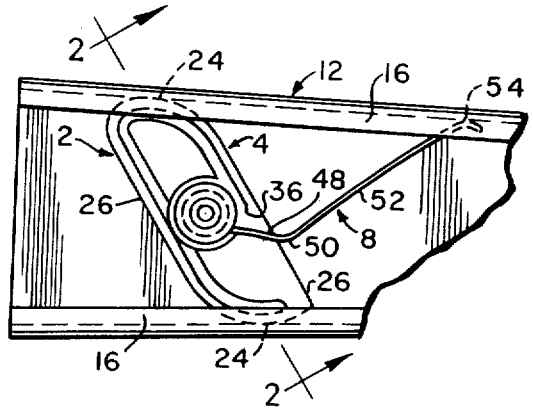
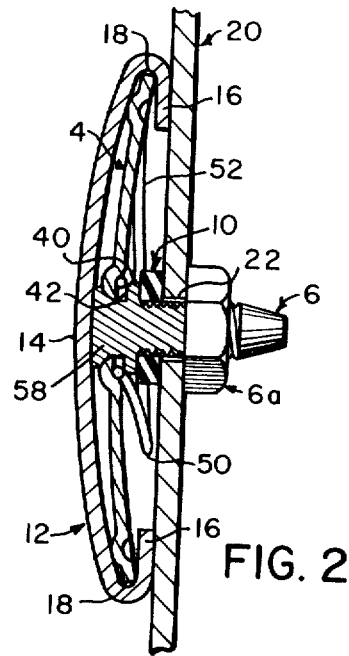
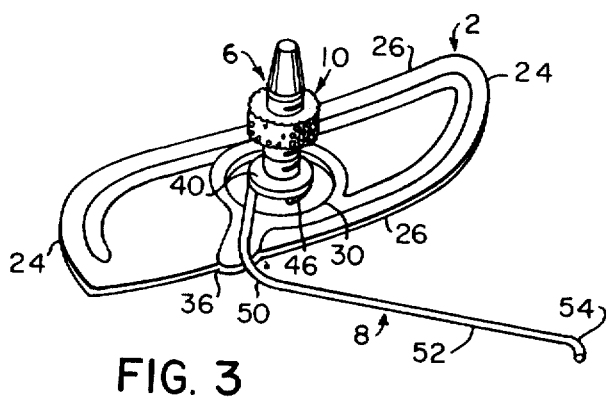
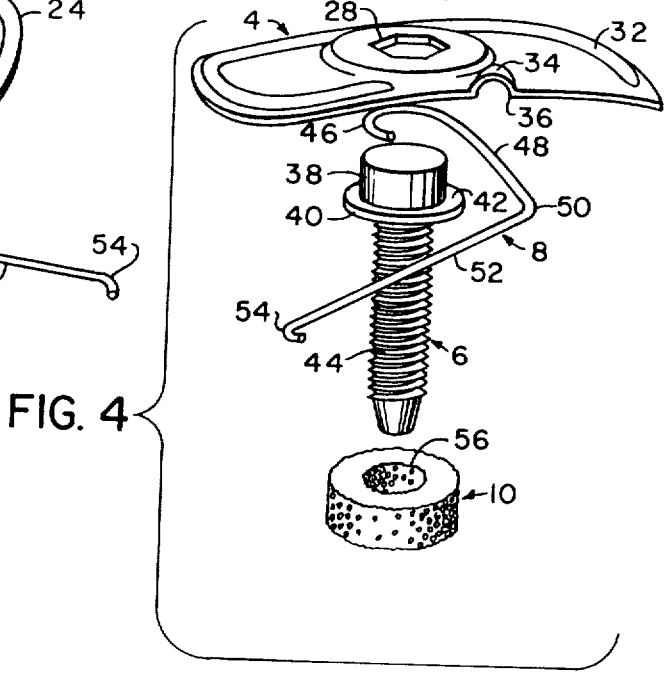
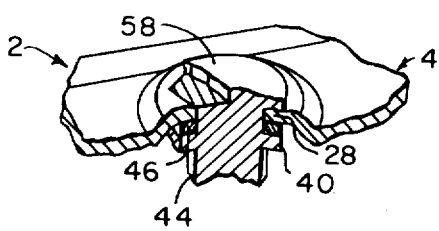
FIG. 1
FIG. 2
FIG. 3
FIG. 4
FIG. 5

MOLDING RETAINER AND METHOD OF COUPLING THE COMPONENT PARTS THEREOF

BACKGROUND OF THE INVENTION

1. Field of the Invention

The invention relates to molding retainers of the type found in U.S. Art Class 24, Subclass 73, entitled "Fasteners Combined" and particularly to retainers of the subclass having a fastener member which is not integral with the molding engaging cross plate and, with reference to the preferred embodiment, a nonintegral, retainer biasing, wire spring arm.

2. Description of the Prior Art

The prior art is best characterized by U.S. Pat. Nos. 2,695,435 (W. A. Bedford, Jr.), 2,852,828 (D. C. Hamman), 2,709,286 (W. A. Bedford, Jr.), and 3,011,234 (T. E. Fiddler). The patents to Bedford, Jr., '435 and Hamman '828 are characterized by a retainer having a spring arm integral with the molding engaging cross plate. Bedford, Jr., '286 points out the principal deficiency in these integral constructions, to wit, that the strengthening of the cross plate through heat treatment, particularly for larger size molding retainers, results in embrittlement in the retainer biasing arm to the extent that the arm frequently breaks in lieu of flexing when placed in tension in a molding assembly. Bedford, Jr., '286 corrected this deficiency by employing a separate wire spring arm joined to an edge of the cross plate by a tongue formed integrally with the cross plate and curled over one end of the wire spring arm. This construction represented a marked improvement in the art and parts manufactured according to the teachings of the patent have enjoyed considerable success in the marketplace. Fiddler sought to and did provide a still further improvement over the teachings of Bedford, Jr., '286 in certain aspects and the Fiddler construction has likewise enjoyed commercial success. Fiddler connected a separate wire spring arm to the bolt of the retainer combination by providing a cross slot in the bolt head and seating a portion of the wire arm in the slot and peening the head material adjacent the slot over the wire arm section seated therein. As the patent clearly states, the advantage gained was the ability to utilize a spring arm of true specified temper in that heat treatment of the cross plate could be completed prior to spring arm attachment. A further advantage according to Fiddler is that the spring arm attachment and the coupling of the bolt to the cross plate can be carried out in a single manufacturing operation. The present invention is seen to provide a still further improvement in the art relative to spring arm attachment in a molding retainer combination as will become evident from the detailed description of a preferred embodiment which follows hereinafter.

Regardless of the type of spring arm connection employed, however, all of the retainer constructions disclosed in the aforementioned patents are characterized by the fact that the cross plate is provided with a polygonally shaped aperture, i.e. one which is square, rectangular, hexagonal, etc., and the bolt shank beneath the head is manufactured, i.e. preformed prior to attachment, with a correspondingly shaped polygonal section to inhibit relative rotation between the bolt and cross plate subsequent to the coupling of those components. While Hamman does not disclose a joint which inhibits relative axial movement between the bolt and cross plate, both Bedford, Jr., patents and the Fiddler patent depict constructions wherein the corners of the polygonal bolt shank section are staked over the underside of the cross plate to thus cooperate with the bolt head in fixing those components against relative axial movement and/or separation. Since the material of the bolt shank is in effect sheared or torn incident to the staking operation and since only a minimal amount of metal is available at the corners of the polygonal section for staking over the cross plate, all of the prior art fasteners are considered somewhat deficient in this aspect, i.e. they disclose a relatively weak fastening of the bolt to the cross plate which increases the possibility for relative axial movement of the components resulting from a fracturing of the staked connecting elements. The present invention remedies this deficiency by providing an improved bolt to cross plate coupling which is more effective in resisting both relative rotation and axial separation of the components and thus contributes to the art a molding retainer which is more efficient and reliable than those heretofore known.

In another aspect, it is common practice in the art, although the aforementioned patents are not particularly indicative of the practice, to include a sealing element in the overall retainer combination to provide a moistureproof seal at the opening in a supporting workpiece to which the retainer and engaged molding are attached, e.g. the body panel of an automobile chassis. Usually the sealing element is in the form of a soft foam plastic ring which is carried by the bolt shank adjacent the side of the cross plate which confronts the supporting workpiece. When such sealers are combined with the fasteners of the prior art references above mentioned, assembly of the sealer has required an additional manufacturing operation subsequent to the coupling of the principal fastening components of the retainer in that post assembly heat treatment in the case of retainers of the Bedford, Jr., type would tend to melt and thus destroy a previously assembled sealing ring and in the case of the Fiddler type retainer the staking operation to fix the bolt to the cross plate would destroy or substantially damage a previously assembled sealing ring. According to the present invention, the method of assembling the retainer fastener components, specifically the fastening of the bolt to the cross plate, permits prior installation of a sealing ring on the bolt shank without any resulting damage to the sealing ring and thereby greatly simplifies the assembly operations and renders production more economical.

Thus the principal objects of the present invention are to provide an improved molding retainer structure with respect to the coupling of the cross plate biasing spring arm to the retainer, to provide an improved bolt to cross plate coupling in either a retainer having the overall structure of the preferred embodiment disclosed or one wherein the spring arm is secured to the cross plate by previously employed coupling means, for example, that disclosed in Bedford, Jr., '286, and to provide an improved method of coupling the components of a molding retainer combination.

BRIEF DESCRIPTION OF THE DRAWING

FIG. 1 is a plan view of a molding retainer according to a preferred embodiment of the invention assembled with a fragmentary length of a molding strip;

FIG. 2 depicts the assembly of FIG. 1, as seen in an enlarged cross section taken on line 2—2 of FIG. 1, secured to a cross sectional, fragmentary portion of an apertured workpiece and additionally depicts a sealing ring disposed about the bolt component of the retainer for effecting a seal at the workpiece aperture;

FIG. 3 is a perspective view of a preferred embodiment of a molding retainer according to the invention including a sealing ring assembled with the bolt component of the retainer;

FIG. 4 is an exploded, perspective view of the components of the preferred embodiment of the molding retainer prior to assembly of the components; and FIG. 5 is a fragmentary perspective view of a cutaway portion of the molding retainer depicting details of the bolt, cross plate and spring arm connection.

DESCRIPTION OF A PREFERRED EMBODIMENT

Referring to the drawing, there is illustrated a molding retainer combination 2 including generally a molding engaging cross plate 4, a bolt 6 for securing the cross plate to an apertured workpiece, a spring arm 8 for biasing the cross plate into an effective molding engaging attitude, and a sealing ring 10 carried by the bolt for effecting a moistureproof seal at one side of a supporting apertured workpiece. The retainer 2 is designed to secure a generally C-shaped molding 12 having a back portion 14 and longitudinal inturned flanges 16 defining opposing recesses 18 to a workpiece 20, e.g., an automobile body panel, having an aperture 22 formed therethrough.

The cross plate 4 has eccentrically arced ends 24 and generally straight side edges 26 extending between its arced ends. The width of the cross plate is less than the distance across the inturned flanges of the molding and its length is greater than said distance. The cross plate is thus adapted to be inserted lengthwise between the molding flanges and rotated until its arced ends 24 are seated in the recesses 18 in the molding behind the flanges 16. Once the cross plate is positioned in the molding as aforesaid, spring arm 8 is unwound to the extent necessary and then released to snap it into one of the molding recesses at a location substantially spaced from the cross plate and thus exert a locking bias on the retainer (see FIG. 1). The angle of inclination of the assembled cross plate relative to the longitudinal axis of the molding will of course vary with the overall width of the molding and it is sufficient for the purposes of this disclosure to state that the described configuration of the cross plate and the biasing action of the spring arm render a given size retainer effective for use over a wide range of molding widths or at spaced locations along a tapering molding strip, as will be well understood by those having familiarity with the art. The fastening of the molding and retainer to the workpiece 20 is subsequently accomplished by passing the shank of the bolt 6 through an opening 22 in the workpiece and torquing a nut 6a onto the bolt and up against the remote surface of the workpiece. As is clearly depicted in FIG. 2, the tightening of the nut 6a draws the confronting surfaces of the molding flanges 16 tightly against the proximate workpiece surface and the sealing ring 10 is compressed against the same surface to provide a moistureproof seal at the workpiece aperture.

The foregoing description is illustrative of the general characteristics of the retainer and its typical molding engaging and attaching function. The construction of the above mentioned retainer components may be varied without departing from the scope of the present invention. The features of the presently preferred embodiment of the retainer and the method of assembling the components thereof in which novelty is seen to reside are more specifically set forth hereinafter.

With reference particularly to FIG. 4, the reader will observe that a hexagonally shaped aperture 28 is blanked out of the central portion of the cross plate 4 and the area of the cross plate surrounding the aperture is embossed to provide a generally circular recess 30 in the underside thereof. Further, the cross plate is generally peripherally embossed at 34 to provide a radially extending underside recess 36 communicating with the recess 30. The bolt 6 includes a solid, cylindriform, rivetlike shank portion 38, a peripheral flange 40 extending radially outwardly from the base of the shank portion 38 and defining a bearing shoulder 42, and a threaded shank portion 44 extending from adjacent the underside of the flange 40 toward the opposite end of the bolt. The diameter of the cylindriform shank portion 38 is less than the minimum width of the aperture 28 in the cross plate. The diameter of the bolt measured across the outer peripheral edge of flange 40 is greater than the maximum width of the cross plate aperture 28.

Wire spring arm 8 includes a loop 46 at one end thereof traversing an arc of approximately 270°, a first relatively straight reach 48 extending from the loop end to an angularly bent bight defining a hinging portion 50 and a second relatively straight reach 52 extending from the hinging portion 50 to the opposite end of the spring arm, which end terminates in a reversely bent (relative to the bend at hinging portion 50) molding engaging portion 54.

Sealing ring 10 which is formed from a relatively soft foam type synthetic plastic has a central opening 56 extending therethrough.

Assembly of the component parts of the retainer combination is accomplished as follows: The sealing ring 10 is first run onto the threaded shank portion 44 of the bolt until it abuts the underside of the flange 40. The bolt and sealing ring assembly is then placed in an appropriate fixture or die and the loop end of the spring arm is placed over the rivetlike shank 38 so that the loop partially circumscribes said shank and rests on the shoulder 42 defined by flange 40. The cross plate 4 is then placed on the bolt with the rivet shank 38 extending through the cross plate aperture 28 and protruding beyond the upper, embossed surface of the cross plate. The looped end 46 of the spring arm thus lies in the recess 30 and the first reach 48 of the arm lies in the communicating radial recess 36. The rivet shank 38 is then deformed to form bolt head 58 whereby the components are locked together with the shoulder 42 of flange 40 tightly clamping the looped end of the spring arm against the under-surface of the cross plate defined by the base of recess 30. Deformation of the rivet shank 38 is accomplished by a process known as "orbital heading" whereby the riveting tool not only advances axially under press head pressure against the surface of the rivet shank, but simultaneously rotates in an orbital path which can best be described as parallel to the wall of an inverted cone. The leading end of the riveting tool contacts the material being deformed, while axially advancing, along a radius line generating from the axis of the tool. With constant pressure being applied along this line, a so-called "wave of material" is formed ahead of the orbiting tool as it advances and the material being displaced is caused to flow both radially outwardly and axially forwardly, in this instance toward the flange 40 of the bolt. The riveting tool rotates at a speed on the order of 1,700 RPM but only a minute quantity of material is displaced per tool revolution. Ergo, minimum friction is created and there is no material tearing or fracturing in that the metal being displaced has sufficient time to properly flow. There is no measurable change in the molecular structure of the material as the result of its deformation from initial to final form and the strength of the ultimate form is equal to the maximum strength exhibited by the metal prior to deformation. By utilization of the orbital heading process the material of the rivet shank 38 is caused to flow radially outwardly to overlie the upper surface of the cross plate and generate the requisite axial tension to draw the retainer components into a securely clamped assembly. Portions of the displaced material are also forced to flow axially into the cross plate aperture 28 and around the internal walls of the cross plate defining said aperture so that the length of the bolt shank lying within said walls is in effect deformed into and assumes a corresponding hexagonal cross sectional shape, completely fills the cross plate aperture and aggressively engages the walls thereof. Since, as aforesaid, this filling of the cross plate aperture and transformation of the cross sectional configuration of the shank portion disposed within the aperture is accomplished without tearing or fracturing the metal, a coupling which provides exceptional strength and resistance to relative bolt to cross plate rotation results. Additionally, the formation of the bolt head 58 by the even, radial metal flow process coupled with the extensive support or bearing area beneath the cross plate provided by the shoulder 42 or flange 40 provides a further improvement in the retainer coupling from the standpoint of resistance to axial separation of components.

The above described coupling and particularly the transformation of the cross sectional configuration of the shank portion and the aggressive engagement of the internal cross plate walls by said transformed shank section can be clearly discerned from a consideration of the cutaway view of the preferred embodiment of the invention depicted in FIG. 5.

It is also clearly evident from the foregoing description of the component assembly process that the assembly can be carried out in a single operation at a single work station regardless of whether the sealing ring 10 is to be included in the retainer combination. It is further evident that heat treatment of the cross plate to strengthen same can be completed prior to component assembly and that a spring arm of true temper unaffected by subjection to heat treatment can be utilized in the retainer combination. This capability is particularly advantageous with regard to larger size retainers in that the high temperature heat treatment required to impart the requisite cross plate strength will seriously adversely affect the resiliency of the wire spring arm.

In a typical automotive mass production facility where retainers of the type contemplated by the invention are utilized, several retainers are usually preinstalled at selected spaced intervals along a molding strip and the strip is at some later stage in the production cycle placed against the exterior of a vehicle body panel with the bolt shanks passing through appropriately sized and spaced preformed panel apertures. Thereafter, nuts are torqued onto the protruding bolt shanks utilizing power wrenches. Frequently, the end of the bolt shank is struck with considerable force as a result of careless misalignment of the nut with the bolt shank as the driving tool is brought into position and energized. In all too many instances the force of this impact is sufficient to fracture the staked retaining lugs which are characteristic of the prior art bolt to cross plate couplings with the result that the bolt head is driven against and dents or otherwise damages the back portion of the molding. Consequently, the molding and fastener must thereafter be replaced at a considerable cost in terms of wasted production effort and material. Thus, the strength of the bolt to cross plate connection which is characteristic of the present invention and is directly attributable to the enlarged bearing area at the undersurface of the cross plate provided by flange 40 is seen to represent a marked improvement in the art. In view of that improvement it has been found that the method of coupling the bolt to the cross plate according to the invention's teachings is highly desirable for use even with older style retainers of the Bedford, Jr., '286 type earlier mentioned, that is a retainer wherein the spring arm is secured to the end of a cross plate by a reversely bent tongue. One can readily visualize that in such a combination the shoulder 42 of the bolt flange 40 would bear directly against the under-surface of the cross plate rather than on the loop end of the spring arm. In all other aspects, however, the bolt to cross plate connection and process for effecting same are the same as above described with regard to the improved embodiment.

Thus, it is to be clearly understood that the foregoing description of a preferred embodiment is to be interpreted only in an illustrative sense and that the scope of the invention is to be determined with reference to the claims which follow.

I claim:

1. A retainer for securing a strip molding having inturned flanges along its side edges to an apertured workpiece, said retainer comprising an apertured cross plate having a first side which at least partially confronts and engages the inturned flanges of the molding, means for attaching said cross plate to the apertured workpiece, said last mentioned means including a head portion overlying the side of said cross plate remote from said first side and a shank portion extending through the aperture in said cross plate, said shank portion having a radially protruding shoulder overlying said first side of said cross plate in spaced relation to said first side, and means for biasing said cross plate into engagement with the molding flanges, said last mentioned means being connected to said shank portion of said attaching means and being clamped against said first side of said cross plate by said shoulder.

2. A retainer according to claim 1 wherein said means for biasing said cross plate into engagement with the molding flanges is a wire spring arm having an attaching portion fixed to said shank portion, a free molding engaging portion disposed outwardly beyond the periphery of said cross plate, and at least one angularly bent hinging portion located between said attaching portion and said molding engaging portion.

3. A retainer according to claim 2 wherein said attaching portion of said spring arm is a substantially closed loop substantially circumscribing said shank portion.

4. A retainer according to claim 3 wherein said cross plate has a shallow recess formed in said first side thereof and said attaching portion of said spring arm is seated in said recess, the base of said recess constituting an area of said first side of said cross plate.

5. A retainer according to claim 4 wherein said recess extends from adjacent said aperture in said cross plate to a peripheral edge of said cross plate and said spring arm has a first, substantially straight reach extending from said attaching portion to said hinging portion, said first reach being disposed substantially in said recess.

6. A retainer according to claim 5 wherein said spring arm has a second, substantially straight reach extending from said hinging portion to said molding engaging portion, said second reach lying substantially outwardly beyond a peripheral edge of said cross plate.

7. A retainer according to claim 1 wherein said radially protruding shoulder on said shank is provided by an integral, circumferential washerlike flange formed thereon.

8. A retainer according to claim 7 wherein said shank portion carries an external screw thread.

9. A retainer according to claim 1 wherein said aperture in said cross plate is polygonal and said shank portion of said attaching means has a width and a cross sectional configuration substantially equal to the said aperture in the cross plate to nonrotatably lock said attaching means to said cross plate.

* * * * *